United States Patent [19]

Hattori et al.

[11] Patent Number: 4,519,947
[45] Date of Patent: May 28, 1985

[54] PROCESS FOR PRODUCING ANTHRAQUINONE COMPOUNDS

[75] Inventors: Makoto Hattori, Osaka; Akihiro Taguma, Hyogo; Toshihiko Morimitsu; Akira Takeshita, both of Osaka, all of Japan

[73] Assignee: Sumitomo Chemical Co., Ltd., Osaka, Japan

[21] Appl. No.: 539,031

[22] Filed: Oct. 4, 1983

[30] Foreign Application Priority Data

Oct. 4, 1982 [JP] Japan .................. 57-175173
Oct. 5, 1982 [JP] Japan .................. 57-175568

[51] Int. Cl.³ .................. C07C 97/24; C07C 143/665
[52] U.S. Cl. .................. 260/371; 260/378
[58] Field of Search .................. 260/371, 378

[56] References Cited

U.S. PATENT DOCUMENTS

| 1,975,386 | 10/1934 | Baumann | 260/371 |
| 2,025,370 | 12/1935 | Baumann | 260/371 |
| 2,795,593 | 6/1957 | Pattison | 260/371 |
| 4,294,769 | 10/1981 | Kröck et al. | 260/378 |
| 4,299,771 | 11/1981 | Takeshita et al. | 260/378 |
| 4,422,973 | 12/1983 | Kröck et al. | 260/378 |

FOREIGN PATENT DOCUMENTS

| 1108704 | 6/1961 | Fed. Rep. of Germany | 260/378 |
| 57-167952 | 10/1982 | Japan | 260/378 |
| 1123945 | 8/1968 | United Kingdom | 260/378 |

Primary Examiner—Glennon H. Hollrah
Assistant Examiner—Raymond Covington
Attorney, Agent, or Firm—Sughrue, Mion, Zinn, Macpeak & Seas

[57] ABSTRACT

A process for producing 1,4-diaminoanthraquinone-2,3-disulfonic acid or a salt thereof which comprises reacting a 1,4-diamino-2,3-dihalogenoanthraquinone with a sulfonating agent in an aqueous medium in the presence of at least one of a quaternary ammonium compound and a quaternary phosphonium compound and optionally, in the presence of an inert organic solvent is disclosed. A process for producing 1,4-diamino-2,3-dicyanoanthraquinone which comprises further reacting the thus obtained 1,4-diaminoanthraquinone-2,3-disulfonic acid or salt thereof with a cyanogenation agent is also disclosed.

28 Claims, No Drawings

PROCESS FOR PRODUCING ANTHRAQUINONE COMPOUNDS

FIELD OF THE INVENTION

The present invention relates to a process for producing 1,4-diaminoanthraquinone-2,3-disulfonic acid or a salt thereof which is an anthraquinone intermediate useful in the dye industry. The invention also relates to a process for producing 1,4-diamino-2,3-dicyanoanthraquinone which is derived from the above-mentioned compounds and is an anthraquinone intermediate useful in the dye industry.

BACKGROUND OF THE INVENTION

It is known that 1,4-diamino-2,3-dicyanoanthraquinone can industrially be produced advantageously by reacting an aqueous solution of 1,4-diaminoanthraquinone-2,3-disulfonic acid with a cyan compound according to the known processes (as disclosed in West Germany Pat. No. 935,669, U.S. Pat. No. 3,203,751, Japanese Patent Publication No. 17643/1974, and Japanese Patent Application (OPI) No. 77251/1981). The term "OPI" as used herein refers to a "published unexamined Japanese patent application". It is known that the starting material of this process, 1,4-diaminoanthraquinone-2,3-disulfonic acid, can be produced by heating a 1,4-diamino-2,3-dihalogenoanthraquinone with boric acid in concentrated sulfuric acid to form a borate compound of the 1,4-diamino-2,3-dihalogenoanthraquinone and then heating this borate compound with an alkali metal sulfite in an aqueous medium, according to the known processes (as disclosed in U.S. Pat. Nos. 1,975,386 and 2,795,593, and Japanese Patent Publication No. 2323/1974).

These known processes involve three steps of boration, sulfonation, and cyanogenation of the 1,4-diamino-2,3-dihalogenoanthraquinone, and suffer from the following disadvantages which result from the use of a large amount of sulfuric acid in the first boration step.

(1) The reaction system requires a large amount of a neutralizing agent or a buffering agent before proceeding to the sulfonation step. Moreover, the reaction system requires a large amount of ice or cooling energy for the removal of heat of neutralization. This costs a great deal.

(2) In the sulfonation step, the reaction system is diluted with a large amount of water and contains a large amount of inorganic salts. Therefore, it is not advantageous from the economical viewpoint to proceed the cyanogenation step as it is and hence, it is necessary to isolate the 1,4-diaminoanthraquinone-2,3-disulfonic acid. This isolation step is accompanied by the discharge of waste water containing a large amount of inorganic salts. This is unfavorable for the preservation of the environment.

(3) The borate compound of the 1,4-diamino-2,3-dihalogenoanthraquinone obtained in the first step is very unstable to heat, acid, or alkali under the condition where water is present as in the second step. Thus a certain amount of the borate compound hydrolyzes during the sulfonation and returns to the starting material. As the result, the yield of 1,4-diaminoanthraquinone-2,3-disulfonic acid is not necessarily satisfactory.

According to another known process, the boration is carried out in an organic solvent such as phenol, acetic anhydride, and nitrobenzene. The former two are disclosed in U.S. Pat. No. 1,975,386, and the last one, in Japanese Patent Application (OPI) No. 69553/1980.

The use of phenol causes an unsolved problem of waste water disposal. The use of acetic anhydride is not useful on an industrial scale because it is reported that a mixture of acetic anhydride and boric acid causes explosion (see *Chemical & Engineering News*, Aug. 20, (1973) p. 42). The last one is not economical because the reaction does not complete unless boric acid is used in large amount (6 to 8 times (in mole) the quantity of starting material). Moreover, these processes have a disadvantage in common that it is necessary to isolate once the borate compound of the 1,4-diamino-2,3-dihalogenoanthraquinone and to recover the used solvent by complex processes.

Thus, the process for using an organic solvent for boration is not satisfactory enough to replace the process for using sulfuric acid and could not completely solve the problem.

In order to overcome the above-mentioned disadvantages, the present inventors carried out a series of studies on the process for converting the halogen atoms in the 1,4-diamino-2,3-dihalogenoanthraquinone directly to the sulfonic groups. As the result, it was unexpectedly found that when the reaction is carried out in an aqueous medium in the presence of at least one of a quaternary ammonium compound and a quaternary phosphonium compound, the 1,4-diamino-2,3-dihalogenoanthraquinone reacts directly with a sulfonating agent such as an alkali metal sulfite to give 1,4-diaminoanthraquinone-2,3-disulfonic acid or a salt thereof. It was also found that when the thus obtained 1,4-diaminoanthraquinone-2,3-disulfonic acid or salt thereof is reacted in succession with a cyanogenation agent without isolation of the 1,4-diaminoanthraquinone-2,3-disulfonic acid or salt thereof, 1,4-diamino-2,3-dicyanoanthraquinone can be obtained easily. The present invention is based on these findings.

SUMMARY OF THE INVENTION

Accordingly, it is an object of this invention to provide a process for producing 1,4-diaminoanthraquinone-2,3-disulfonic acid or a salt thereof which comprises reacting a 1,4-diamino-2,3-dihalogenoanthraquinone with a sulfonating agent in an aqueous medium in the presence of at least one of a quaternary ammonium compound and a quaternary phosphonium compound and optionally, in the presence of an inert organic solvent.

It is another object of this invention to provide a process for producing 1,4-diamino-2,3-dicyanoanthraquinone which comprises reacting the thus obtained 1,4-diaminoanthraquinone-2,3-disulfonic acid or salt thereof with a cyanogenation agent in succession without isolation of the 1,4-diaminoanthraquinone-2,3-disulfonic acid or salt thereof.

DETAILED DESCRIPTION OF THE INVENTION

It has been recognized that the halogen atoms at the 2- and 3-positions of the 1,4-diamino-2,3-dihalogenoanthraquinone bond firmly to the nucleus, and therefore, in order to substitute the halogen atoms by sulfonic groups, it is necessary to activate the halogen atoms by forming a borate compound thereof (see German Pat. No. 935,669). In other words, it was not foreseen that the halogen atoms can be directly substituted by sulfonic groups without the formation of borate compound.

The invention is described in detail in the following. At first, the sulfonation reaction is described.

The 1,4-diamino-2,3-dihalogenoanthraquinone used in this invention includes 1,4-diamino-2,3-dichloroanthraquinone and 1,4-diamino-2,3-dibromoanthraquinone.

The quaternary ammonium compound used in this invention includes quaternary ammonium compounds represented by the formula (I) or (II):

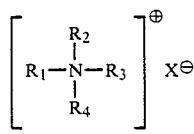

(I)

wherein $R_1$ and $R_2$ are each an alkyl group having 1 to 24 carbon atoms or an unsubstituted or substituted benzyl group; $R_3$ and $R_4$ are each an alkyl group having 1 to 10 carbon atoms; and $X^\ominus$ is an anion residue.

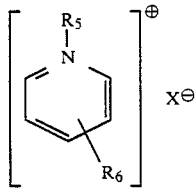

(II)

wherein $R_5$ is an alkyl group having 1 to 24 carbon atoms; $R_6$ is a hydrogen atom or a methyl group; and $X^\ominus$ is the same as defined above.

The anion residue in the formulae (I) and (II) includes, for example, chlorine, bromine, iodine; residues of sulfates, phosphates, acetates, methylsulfates, ethylsulfates, hydrogensulfates, hydrogenphosphates, dihydrogenphosphates, carbonates, hydrogencarbonates, sulfites, hydrogensulfites, cyanides, cyanates, thiocyanates, and nitrates; and a hydroxyl group.

Specific examples of the quaternary ammonium compounds include tetramethylammonium chloride, tetraethylammonium chloride, tetra-n-propylammonium chloride, tetra-n-butylammonium chloride, tetramethylammonium methylsulfate, tetraethylammonium ethylsulfate, triethylpropylammonium chloride, octyltrimethylammonium chloride, dodecyltrimethylammonium chloride, hexadecyltrimethylammonium chloride, octadecyltrimethylammonium chloride, tetracosyltrimethylammonium chloride, dioctadecyldimethylammonium chloride, diheptadecyldimethylammonium chloride, trioctylmethylammonium chloride, and other tetraalkylammonium compounds; benzyltrimethylammonium chloride, benzyltriethylammonium chloride, benzyltripropylammonium chloride, benzylethyldipropylammonium chloride, dodecyldimethylbenzylammonium chloride, o-, m-, or p-methoxybenzyltriethylammonium chloride, o-, m-, or p-chlorobenzyltriethylammonium chloride, octylbenzyldimethylammonium chloride, diethylbenzylammonium chloride, and other benzyltrialkylammonium compounds and dibenzyldialkylammonium compounds; N-methylpyridinium chloride, N-ethylpyridinium chloride, N-butylpyridinium chloride, N-dodecylpyridinium chloride, N-octadecylpyridinium chloride, N-methylpicolinium chloride, N-butylpicolinium chloride, N-dodecylpicolinium chloride, and other N-alkylpyridinium compounds and N-alkylpicolinium compounds; and salts corresponding to the above chlorides such as bromides, iodides, hydroxides, sulfates, phosphates, hydrogensulfates, acetates, methylsulfates, ethylsulfates, hydrogenphosphates, dihydrogenphosphates, carbonates, hydrogencarbonates, sulfites, hydrogensulfites, cyanides, cyanates, thiocyanates, and nitrates, and mixtures thereof.

Industrially preferable among them are benzyltrimethylammonium chloride and benzyltriethylammonium chloride and other benzyltrialkylammonium compounds.

The amount of the quaternary ammonium compound to be used varies depending upon the kind thereof. The quaternary ammonium compound is usually used in an amount of 2 to 90 wt% based on the total weight of the quaternary ammonium compound and the aqueous medium. In case of the tetraalkylammonium compound, it is used in an amount of 30 to 90 wt%, preferably 40 to 80 wt%; in case of the benzyltrialkylammonium compound, it is used in an amount of 10 to 85 wt%, preferably 15 to 80 wt%; and in case of the N-alkylpyridinium compound or N-alkylpicolinium compound, it is used in an amount of 2 to 60 wt%, preferably 5 to 50 wt%. Thus benzyltriethylammonium chloride is used in an amount of 20 to 75 wt%, preferably 30 to 70 wt%. A quaternary ammonium compound which is more lipophilic may be used in a less amount than those specified above; and a quaternary ammonium compound which is less lipophilic may be used in a more amount than those specified above.

The quaternary phosphonium compound used in this invention includes quaternary phosphonium compounds represented by the formula (III):

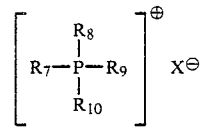

(III)

wherein $R_7$, $R_8$, $R_9$, and $R_{10}$ are each an alkyl group having 1 to 24 carbon atoms or a phenyl group, in which $R_7$ may be a benzyl group; and $X^\ominus$ is an anion residue.

The anion residue in the formula (III) includes, for example, chlorine, bromine, and iodine; residues of sulfates, phosphates, acetates, hydrogensulfates, hydrogenphosphates, dihydrogenphosphates, carbonates, hydrogencarbonates, sulfites, hydrogensulfites, cyanides, cyanates, thiocyanates, and nitrates; and a hydroxyl group.

Examples of the quaternary phosphonium compounds include tetramethylphosphonium chloride, tetraethylphosphonium chloride, tetrabutylphosphonium chloride, octyltriethylphosphonium chloride, hexadecyltriethylphosphonium chloride, hexadecyltributylphosphonium chloride, dodecyltrimethylphosphonium chloride, trioctylethylphosphonium chloride, tetracosyltriethylphosphonium chloride, and other tetraalkylphosphonium compounds; benzyltriethylphosphonium chloride, benzyltributylphosphonium chloride, and other benzyltrialkylphosphonium compounds; methyltriphenylphosphonium chloride, ethyltriphenylphosphonium chloride, and other alkyltriphenylphosphonium compounds; tetraphenylphosphonium chlorie; and salts corresponding to the above chlorides such as bromides, iodides, hydroxides, sulfates, phosphates, acetates, hydrogensulfates, hydrogenphosphates, dihydrogenphosphates, carbonates, hydrogencarbonates, sulfites, hydrogensulfites, cyanides, cyanates, thiocyanates, and nitrates, and mixtures thereof.

The amount of the quaternary phosphonium compound to be used varies depending upon the kind thereof. The quaternary phosphonium compound is usually used in an amount of 2 to 80 wt% based on the total weight of the quaternary phosphonium compound and the aqueous medium. In case of the tetraalkylphosphonium compound, it is used in an amount of 20 to 80 wt%, preferably 25 to 75 wt%; in case of the benzyltrialkylphosphonium compound, it is used in an amount of 5 to 75 wt%, preferably 10 to 70 wt%; and in case of the alkyltriphenylphosphonium compound, it is used in an amount of 2 to 60 wt%, preferably 5 to 50 wt%. Thus methyltriphenylphosphonium bromide is used in an amount of 10 to 50 wt%, preferably 15 to 45 wt%. A quaternary phosphonium compound which is more lipophilic may be used in a less amount than those specified above. For instance, tetraphenylphosphonium chloride is used in an amount of 2 to 40 wt%. A quaternary phosphonium compound which is less lipophilic may be used in a more amount than those specified above.

A quaternary phosphonium compound and a quaternary ammonium compound may be used in combination with each other. When a mixture of the quaternary ammonium compound and the quaternary phosphonium compound is used, the mixture is usually used in an amount of 2 to 90 wt% based on the total weight of the quaternary ammonium compound, quaternary phosphonium compound and aqueous medium, in which the amount of the quaternary ammonium compound is from 2 to 90 wt% based on the total weight of the quaternary ammonium compound and the aqueous medium, and in which the amount of the quaternary phosphonium compound is from 2 to 80 wt% based on the total weight of the quaternary phosphonium compound and the aqueous medium.

The aqueous medium containing at least one of a quaternary ammonium compound and a quaternary phosphonium compound is used in an amount of 2 to 30 times (by weight) the quantity of the 1,4-diamino-2,3-dihalogenoanthraquinone.

In the case where the quantity of the aqueous medium is comparatively small, it is desirable to add an inert organic solvent to the system. Examples of the inert organic solvent include monochlorobenzene, 1,2-dichlorobenzene, 1,2,4-trichlorobenzene, 1,3,5-trichlorobenzene, and other halogenated aromatic hydrocarbons, and nitrobenzene. The inert organic solvent is usually used in an amount of 2 to 20 times (by weight) the quantity of the 1,4-diamino-2,3-dihalogenoanthraquinone.

In the case where a comparatively water-insoluble quaternary ammonium compound or quaternary phosphonium compound is used, a water-soluble organic solvent may be added. Examples of such a water-soluble solvent include ethylene glycol, ethylene glycol monoalkyl ethers, diethylene glycol monoalkyl ethers, triethylene glycol, triethylene glycol monoalkyl ethers, formamide, methylformamide, dimethylformamide, N-alkylpyrrolidones, dimethyl sulfoxide, sulfolane, hexamethylphosphoric triamide, methanol, ethanol, propanol, butanol, pyridine, and picoline, and mixtures thereof.

The sulfonating agent used in this invention is an alkali metal sulfite such as sodium sulfite and potassium sulfite; an alkali metal hydrogensulfite such as sodium hydrogensulfite and potassium hydrogensulfite; or ammonium sulfite or ammonium hydrogensulfite. The sulfonating agent is used in an amount of 2.0 to 5.0 moles, preferably 2.2 to 4.0 moles, per mole of the 1,4-diamino-2,3-dihalogenoanthraquinone.

In the process of this invention, the sulfonation can be carried out over a broad range of pH, i.e., from 4 to 11. If the reaction is performed below this pH range, the sulfonation does not likely take place effectively because sulfurous acid gas is scattered and lost outside the system. If the reaction is carried out above this pH range, 1-amino-4-oxyanthraquinone-2,3-disulfonic acid is likely formed as a by-product due to hydrolysis of the product.

If desired, the pH value of the reaction mixture may be properly adjusted by adding a buffering agent to the reaction system. Examples of such a buffering agent include sodium carbonate, sodium phosphate, sodium hydrogencarbonate, dipotassium hydrogenphosphate, sodium dihydrogenphosphate, and potassium dihydrogenphosphate. The control of pH may be accomplished by adding a suitable alkali such as sodium hydroxide, potassium hydroxide, sodium carbonate, and sodium acetate in the form of as it is or aqueous solution at a proper time.

Usually, the reaction proceeds at 50° C. or above; the preferred reaction temperature is 70° to 120° C. The reaction usually completes within 4 to 40 hours.

It is permissible to add to the reaction system a catalytic amount of boric acid compounds such as orthoboric acid, metaboric acid, boric anhydride, sodium borate, and potassium borate, preferably in an amount of 1 mole or less per mole of the starting material.

It is also permissible to add to the reaction system a catalytic amount of copper compounds such as copper sulfate, cuprous chloride, cupric chloride, copper oxide, basic copper carbonate, and copper acetate, preferably in an amount of 0.5 mole or less per mole of the starting material.

The 1,4-diaminoanthraquinone-2,3-disulfonic acid or salt thereof formed by the sulfonation as described above may be isolated, if desired, from the reaction mixture after the reaction by crystallization such as acid precipitation or salting-out or a combination thereof. After filtration of the thus precipitated crystals, the desired product of high purity can be obtained in the form of sulfonic acid or salt thereof. However, in the case where this compound is converted into 1,4-diamino-2,3-dicyanoanthraquinone, it is preferable to subject the 1,4-diaminoanthraquinone-2,3-disulfonic acid or salt thereof to the cyanogenation reaction in succession without isolation of the 1,4-diaminoanthraquinone-2,3-disulfonic acid or salt thereof. Prior to the cyanogenation reaction, the reaction mixture may be subjected to clarification and filtration, if desired.

The cyanogenation reaction is described. The cyanogenation reaction itself can be performed according to the process as disclosed in Japanese Patent Application (OPI) No. 77251/1981.

The amount of the quaternary ammonium compound or quaternary phosphonium compound to be present in the reaction system varies depending upon the kind thereof, and is generally from 2 to 90 wt% based on the total weight of the quaternary compound and water. The amount of the tetraalkylammonium compound is 10 to 90 wt%, preferably 15 to 80 wt%; the amount of the trialkylbenzylammonium compound is 2 to 80 wt%, preferably 2.5 to 70 wt%; the amount of the N-alkylpyridinium compound is 2 to 50 wt%, preferably 5 to 40 wt%; the amount of the tetraalkylphosphonium compound is 10 to 70 wt%, preferably 15 to 65 wt%; the amount of the benzyltrialkylphosphonium compound is 2 to 70 wt%, preferably 2.5 to 60 wt%; and the amount of the alkyltriphenylphosphonium compound is 1 to 50 wt%; preferably 2 to 40 wt%. For example, benzyltriethylammonium chloride is used in an amount of 2 to 70 wt%, preferably 2.5 to 60 wt%. If desired, the concentration of the quaternary compound may be adjusted by adding water to the reaction mixture after the sulfonation reaction.

The cyanogenation agent used in this invention includes, for example, cyanides of alkali metals, alkaline earth metals, or ammonia; more specifically, sodium cyanide, potassium cyanide, ammonium cyanide, magnesium cyanide, and calcium cyanide, and mixtures thereof. Particularly preferable among them are sodium cyanide and potassium cyanide. Cyanhydrins such as acetone cyanhydrin which form a cyan ion in water can also be used. The cyanogenation agent is used in an amount of 2.0 to 10 moles per mole of the 1,4-diamino-2,3-dihalogenoanthraquinone.

The cyanogenation reaction is carried out at a pH of 8 to 11, preferably 8.5 to 10.5. When the cyanogenation reaction is performed at a pH lower than this limit, liberation of hydrogen cyanide from the reaction system occurs and the cyanogenation agent is not effectively used. On the other hand, when the cyanogenation reaction is carried out at a pH higher than this limit, excessive hydrolysis of the intermediate and main reaction product is promoted in the course of reaction, and such is, therefore, not desirable.

The pH value of the reaction mixture can be adjusted by adding a sufficient amount of a usual buffering agent, which has been exemplified in the description of the sulfonation reaction.

The pH value of the reaction mixture can also be adjusted by adding a suitable strong acid or weak acid such as hydrochloric acid, sulfuric acid, phosphoric acid, formic acid, acetic acid, and propionic acid during the reaction with the cyanide.

In some cases, the cyanogenation reaction can be advantageously performed by adding a dehydrogenating agent to the reaction system. Examples of the dehydrogenating agent include organic nitro compounds such as nitrobenzene, nitrobenzenesulfonic acid, and nitrophenol; and sodium, potassium, and ammonium salts of organic and inorganic peracids such as peracetic acid, persulfuric acid, perboric acid, and perphosphoric acid; and sulfur. Dehydrogenation can also be performed by using oxygen in air. In this case, it is preferable to add ammonium molybdate or ammonium vanadate.

In this invention, the cyanogenation reaction is carried out at 40° to 100° C., preferably 50° to 90° C. When the reaction temperature is high, the reaction rate is high, but the pH should be set as low as possible to prevent excessive hydrolysis. When the reaction temperature is low, the pH should be set as high as possible but not exceeding 11. The reaction usually completes within 2 to 20 hours. After completion of the reaction, the excess cyanogenation agent is decomposed using sodium hypochlorite or hydrogen peroxide, followed by filtration to obtain 1,4-diamino-2,3-dicyanoanthraquinone.

The quaternary ammonium compound or quaternary phosphonium compound used in this invention can be recovered as such from the filtrate using an alkali, or can be recovered by extracting it in the form of quaternary ammonium hydroxide or quaternary phosphonium hydroxide with an organic solvent and then back extracting with acidic water, without any losses.

According to the process of this invention, 1,4-diaminoanthraquinone-2,3-disulfonic acid or a salt thereof can be produced in the form of concentrated solution from the 1,4-diamino-2,3-dihalogenoanthraquinone in one step. The reaction product may be then subjected to the cyanogenation reaction in succession without being isolated to give 1,4-diamino-2,3-dicyanoanthraquinone. The quaternary ammonium compound or quaternary phosphonium compound used for the sulfonation is also effective in raising the yield and improving the purity of the desired product. Thus 1,4-diamino-2,3-dicyanoanthraquinone of high purity can be obtained in a high yield. The process of this invention does not involve problems of disposing of sulfuric acid and waste water. Therefore, the process of this invention is economically advantageous and industrially valuable.

The invention is now described in more detail with reference to the following examples, in which "parts" means "parts by weight" and "%" means "wt%", respectively.

EXAMPLE 1

To a mixture composed of 55.6 parts of benzyltriethylammonium chloride and 55.6 parts of water was added 5.0 parts of 1,4-diamino-2,3-dichloroanthraquinone. With thorough stirring, 7.18 parts of anhydrous sodium sulfite was added. The reaction system was adjusted to a pH of 9.2 with a 28% aqueous solution of sodium hydroxide. With thorough stirring, the mixture was heated to 90° to 95° C., and the reaction was carried out until the chromatographic analysis showed that the starting material was substantially consumed. During the reaction, the reaction system was kept at a pH of 9.0 to 9.2 with a 28% aqueous solution of sodium hydroxide.

The reaction mixture was filtered at 70° C. to remove a small amount of insoluble matters. After cooling, the filtrate was subjected to acid precipitation with 78% sulfuric acid to a pH of 1, followed by separating out the precipitated crystals. The crystals were washed with dilute hydrochloric acid and dried to give a product corresponding to 6.2 parts of 1,4-diaminoanthraquinone-2,3-disulfonic acid. This product was a reddish violet crystal, and the chromatographic analysis showed that this product was the same product as obtained according to the process disclosed in U.S. Pat. No. 2,795,593.

EXAMPLE 2

To a mixture composed of 55.6 parts of benzyltriethylammonium chloride and 55.6 parts of water were added 5.0 parts of 1,4-diamino-2,3-dichloroanthraquinone and 7.18 parts of anhydrous sodium sulfite. With thorough stirring, the reaction system was adjusted to a pH of 9.2 with a 28% aqueous solution of sodium hydroxide. The mixture was heated to 90° to 95° C., and the reaction was carried out until the chromatographic analysis showed that the starting material was substantially consumed. During the reaction, the reaction system was kept at a pH of 9.0 to 9.2 with a 28% aqueous solution of sodium hydroxide.

Then, 0.5 part of diatomaceous earth was added to the reaction mixture, followed by filtration at 70° C. The filter cake was washed with 28 parts of warm water, and the washings were combined with the filtrate.

The filtrate and washings were cooled to 25° C., and 3.2 parts of sodium cyanide was added thereto. The reaction mixture was heated to 60° to 65° C. while keeping the reaction system at a pH of 9.4 to 9.8 with a 43% aqueous solution of phosphoric acid. The reaction was carried out until the chromatographic analysis showed that the 1,4-diaminoanthraquinone-2,3-disulfonic acid was consumed.

Excess sodium cyanide was decomposed with a 35% aqueous solution of hydrogen peroxide. After filtration, the filter cake was washed thoroughly with warm water and dried to obtain 4.2 parts of 1,4-diamino-2,3-dicyanoanthraquinone.

The chromatographic analysis showed that this product was a single substance. The results of elemental analysis were as follows:

|  | C % | H % | N % |
| --- | --- | --- | --- |
| Calculated for ($C_{16}H_8N_4O_2$) | 66.66 | 2.80 | 19.44 |
| Found | 66.50 | 2.70 | 18.95 |

EXAMPLE 3

To a mixture composed of 16.9 parts of benzyltrimethylammonium chloride and 11.3 parts of water were added 5.0 parts of 1,4-diamino-2,3-dichloroanthraquinone and 50 parts of monochlorobenzene. With thorough stirring, 8.0 parts of anhydrous potassium sulfite was added. The mixture was heated to 90° to 95° C., and the reaction was carried out until the chromatographic analysis showed that the starting material was substantially consumed. During the reaction, the pH of the reaction system was 9.5 to 8.5.

The monochlorobenzene was removed from the reaction mixture by steam distillation. The reaction mixture was filtered at 70° C. to remove insoluble matters. The filtrate was treated in the same manner as in Example 1 to give a product corresponding to 6.2 parts of 1,4-diaminoanthraquinone-2,3-disulfonic acid.

The same results were obtained when the benzyltrimethylammonium chloride was replaced by benzyltrimethylammonium bromide.

EXAMPLE 4

The sulfonation reaction was carried out in the same manner as in Example 3.

The monochlorobenzene was removed from the reaction mixture by steam distillation. The reaction mixture was subjected to clarification and filtration by the addition of 0.5 part of diatomaceous earth at 70° C.

The filtrate was cooled to 25° C., and 4.2 parts of potassium cyanide and 0.2 part of sodium m-nitrobenzenesulfonate were added to the filtrate. The reaction mixture was heated to 65° to 70° C. while keeping at a pH of 9.3 to 9.6 with a 30% aqueous solution of sulfuric acid, and the reaction was carried out until the chromatographic analysis showed that the 1,4-diaminoanthraquinone-2,3-disulfonic acid was consumed.

Excess potassium cyanide was decomposed with a 12% solution of sodium hypochlorite. After filtration, the filter cake was washed thoroughly with warm water and dried to give 4.2 parts of 1,4-diamino-2,3-dicyanoanthraquinone.

The same results were obtained when the benzyltrimethylammonium chloride was replaced by benzyltrimethylammonium bromide.

EXAMPLE 5

To a mixture composed of 59.5 parts of dodecyltrimethylammonium chloride and 48.7 parts of water was added 6.45 parts of 1,4-diamino-2,3-dibromoanthraquinone. With thorough stirring, 5.7 parts of anhydrous sodium sulfite was added. The reaction system was adjusted to a pH of 9.6 with a 28% aqueous solution of sodium hydroxide. The mixture was heated to 80° to 85° C. with thorough stirring, and the reaction was carried out until the chromatographic analysis showed that the starting material was substantially consumed. During the reaction, the reaction system was kept at a pH of 9.2 to 9.6 with a 28% aqueous solution of sodium hydroxide.

The reaction mixture was then filtered at 80° C. to remove a small amount of insoluble matters. To the filtrate was added 36 parts of sodium chloride. After cooling, the precipitated crystals were filtered out and washed with a dilute sodium chloride solution and dried to give reddish blue crystals corresponding to 6.2 parts of 1,4-diaminoanthraquinone-2,3-disulfonic acid. The chromatographic analysis showed that this product was identical with the reaction product obtained according to the process disclosed in U.S. Pat. No. 2,795,593.

The same results were obtained when the dodecyltrimethylammonium chloride was replaced by dodecyltrimethylammonium bromide.

EXAMPLE 6

The sulfonation reaction was carried out in the same manner as in Example 5.

The reaction mixture was cooled to 25° C., and 2.5 parts of sodium cyanide and 0.1 part of nitrobenzene were added thereto. The reaction mixture was heated to 60° to 65° C. while keeping at a pH of 9.5 to 9.8 with a 50% aqueous solution of acetic acid, and the reaction was carried out until the chromatographic analysis showed that the 1,4-diaminoanthraquinone-2,3-disulfonic acid was consumed.

After proceeding the same treatment as in Example 2, there was obtained 4.1 parts of 1,4-diamino-2,3-dicyanoanthraquinone.

The same results were obtained when the dodecyltrimethylammonium chloride was replaced by dodecyltrimethylammonium bromide.

EXAMPLE 7

To a mixture composed of 78.7 parts of tetra-n-butylammonium bromide and 42.3 parts of water was added 5.0 parts of 1,4-diamino-2,3-dichloroanthraquinone. With thorough stirring, 7.18 parts of anhydrous sodium sulfite and 0.9 part of sodium phosphate were added. The reaction mixture was heated to 90° to 95° C., and the reaction was carried out until the chromatographic analysis showed that the starting material was substantially consumed.

After completion of the reaction, the reaction product was post-treated in the same manner as in Example 5 to obtain a product corresponding to 6.2 parts of 1,4-diamino-2,3-disulfonic acid.

EXAMPLE 8

The sulfonation reaction was carried out in the same manner as in Example 7.

The reaction mixture was cooled to 25° C., and then 3.0 parts of potassium cyanide was added thereto. The reaction mixture was heated to 60° to 65° C. while keeping at a pH of 9.5 to 9.8 with a 30% aqueous solution of sulfuric acid, and the reaction was carried out until the chromatographic analysis showed that the 1,4-diaminoanthraquinone-2,3-disulfonic acid was consumed.

After proceeding the same treatment as in Example 2, there was obtained 4.0 parts of 1,4-diamino-2,3-dicyanoanthraquinone.

EXAMPLE 9

To a mixture composed of 14 parts of N-butylpyridinium chloride, 32.6 parts of water, and 14 parts of pyridine was added 5.0 parts of 1,4-diamino-2,3-dichloroanthraquinone. With thorough stirring, 6.4 parts of anhydrous potassium sulfite was added. The reaction mixture was heated to 95° to 100° C., and the reaction was carried out until the chromatographic analysis showed that the starting material was substantially consumed. During the reaction, the pH of the reaction system was 9 to 9.5.

After completion of the reaction, the reaction product was post-treated in the same manner as in Example 1 to obtain a product corresponding to 6.2 parts of 1,4-diamino-2,3-disulfonic acid.

EXAMPLE 10

The sulfonation reaction was carried out in the same manner as in Example 9.

The reaction mixture was cooled to 25° C., and then 3.2 parts of sodium cyanide was added thereto. The reaction mixture was heated to 60° to 65° C. while keeping at a pH of 9.4 to 9.8 with a 43% aqueous solution of phosphoric acid, and the reaction was carried out until the chromatographic analysis showed that the 1,4-diaminoanthraquinone-2,3-disulfonic acid was consumed.

After proceeding the same treatment as in Example 2, there was obtained 4.0 parts of 1,4-diamino-2,3-dicyanoanthraquinone.

EXAMPLE 11

To a mixture composed of 32.6 parts of benzyltriethylammonium chloride and 32.6 parts of water were added 5.0 parts of 1,4-diamino-2,3-dichloroanthraquinone, 1.0 part of boric acid, and 50 parts of 1,2-dichlorobenzene. With thorough stirring, 7.18 parts of anhydrous sodium sulfite was added. The reaction mixture was heated to 90° to 95° C., and the reaction was carried out until the chromatographic analysis showed that the starting material was substantially consumed. During the reaction, the pH of the reaction system was 7.5 to 8.5.

The 1,2-dichlorobenzene was removed from the reaction mixture by steam distillation, and the reaction mixture was filtered at 70° C. to remove insoluble matters. After proceeding the same post-treatment as in Example 1, there was obtained a product corresponding to 6.1 parts of 1,4-diaminoanthraquinone-2,3-disulfonic acid.

EXAMPLE 12

To a mixture composed of 32.6 parts of benzyltriethylammonium chloride and 32.6 parts of water were added 5.0 parts of 1,4-diamino-2,3-dichloroanthraquinone, 0.6 part of boric acid, and 50 parts of 1,2-dichlorobenzene. With thorough stirring, 7.18 parts of anhydrous sodium sulfite was added. The mixture was heated to 90° to 95° C., and the reaction was carried out until the chromatographic analysis showed that the starting material was substantially consumed. During the reaction, the pH of the reaction system was 7.5 to 8.5.

The 1,2-dichlorobenzene was removed from the reaction mixture by steam distillation, the distillate was separated, and the water layer was returned to the reaction system. 0.5 part of diatomaceous earth was added to the reaction system, followed by filtration at 70° C. The filter cake was washed with 16.3 parts of warm water, and the washings were combined with the filtrate.

The filtrate and washings were cooled to 25° C., and 3.2 parts of sodium cyanide and 0.1 part of nitrobenzene were added thereto. The reaction mixture was heated to 60° to 65° C. while keeping at a pH of 9.4 to 9.8 with a 50% aqueous solution of sulfuric acid. The reaction was carried out until the chromatographic analysis showed that the 1,4-diaminoanthraquinone-2,3-disulfonic acid was consumed.

After proceeding the same post-treatment as in Example 2, there was obtained 4.2 parts of 1,4-diamino-2,3-dicyanoanthraquinone.

EXAMPLE 13

To a mixture composed of 20 parts of methyltriphenylphosphonium bromide and 30 parts of water was added 5.0 parts of 1,4-diamino-2,3-dichloroanthraquinone. With thorough stirring, 8.0 parts of anhydrous potassium sulfite was added. The reaction system was adjusted to a pH of 9.2 with a 28% aqueous solution of potassium hydroxide. With thorough stirring, the reaction mixture was heated to 100° to 105° C., and the reaction was carried out until the chromatographic analysis showed that the starting material was substantially consumed. During the reaction, the pH of the reaction system was kept at 9.0 to 9.2 with a 28% aqueous solution of potassium hydroxide.

After proceeding the same post-treatment as in Example 1, there was obtained a product corresponding to 6.1 parts of 1,4-diaminoanthraquinone-2,3-disulfonic acid.

EXAMPLE 14

The sulfonation reaction was carried out in the same manner as in Example 13.

After completion of the sulfonation reaction, the cyanogenation reaction was carried out in the same manner as in Example 2 to obtain 4.1 parts of 1,4-diamino-2,3-dicyanoanthraquinone.

EXAMPLE 15

To a mixture composed of 50 parts of hexadecyltriethylphosphonium chloride and 50 parts of water was added 6.45 parts of 1,4-diamino-2,3-dibromoanthraquinone. With thorough stirring, 5.7 parts of anhydrous sodium sulfite was added. The reaction system was adjusted to a pH of 9.4 with a 28% aqueous solution of sodium hydroxide. With thorough mixing, the reaction mixture was heated to 85° to 90° C., and the reaction was carried out until the chromatographic analysis showed that the starting material was substantially consumed. During the reaction, the pH of the reaction system was 9.4 to 8.3.

After completion of the reaction, the reaction product was post-treated in the same manner as in Example 5 to obtain a product corresponding to 6.2 parts of 1,4-diaminoanthraquinone-2,3-disulfonic acid.

EXAMPLE 16

The sulfonation reaction was carried out in the same manner as in Example 15.

After completion of the sulfonation reaction, the cyanogenation reaction was carried out in the same manner as in Example 4 to obtain 4.1 parts of 1,4-diamino-2,3-dicyanoanthraquinone.

EXAMPLE 17

To a mixture composed of 15 parts of tetrabutylphosphonium chloride and 15 parts of water were added 5.0 parts of 1,4-diamino-2,3-dichloroanthraquinone and 50 parts of 1,2,4-trichlorobenzene. With thorough stirring, 8.0 parts of anhydrous potassium sulfite was added. The reaction mixture was heated to 110° to 115° C., and the reaction was carried out until the chromatographic analysis showed that the starting material was substantially consumed.

The trichlorobenzene was removed by steam distillation, and the reaction mixture was filtered at 80° C. to remove insoluble matters.

After proceeding the same post-treatment as in Example 1, there was obtained a product corresponding to 6.1 parts of 1,4-diaminoanthraquinone-2,3-disulfonic acid.

EXAMPLE 18

The sulfonation reaction was carried out in the same manner as in Example 17.

The trichlorobenzene was removed by steam distillation, and the reaction mixture was filtered at 80° C. to remove insoluble matters. The cyanogenation reaction was carried out the same manner as in Example 2 to obtain 4.0 parts of 1,4-diamino-2,3-dicyanoanthraquinone.

EXAMPLE 19

To a mixture composed of 25 parts of benzyltriethylphosphonium bromide and 25 parts of water was added 5.0 parts of 1,4-diamino-2,3-dichloroanthraquinone. With thorough stirring, 7.18 parts of anhydrous potassium sulfite was added. The reaction mixture was heated to 90° to 95° C., and the reaction was carried out until the chromatographic analysis showed that the starting material was substantially consumed. During the reaction, the pH of the reaction system was 9.5 to 8.5.

After completion of the reaction, the same post-treatment as in Example 1 was carried out to obtain a product corresponding to 6.1 parts of 1,4-diaminoanthraquinone-2,3-disulfonic acid.

EXAMPLE 20

The sulfonation reaction was carried out in the same manner as in Example 19.

After completion of the sulfonation reaction, the cyanogenation reaction was carried out in the same manner as in Example 2 to obtain 4.2 parts of 1,4-diamino-2,3-dicyanoanthraquinone.

EXAMPLE 21

To a mixture composed of 10 parts of tetraphenylphosphonium chloride, 40 parts of water, and 10 parts of N,N-dimethylformamide was added 5.0 parts of 1,4-diamino-2,3-dichloroanthraquinone. With thorough stirring, 6.5 parts of anhydrous potassium sulfite was added. The reaction mixture was heated to 100° to 105° C., and the reaction was carried out until the chromatographic analysis showed that the starting material was substantially consumed.

After completion of the reaction, the same post-treatment as in Example 5 was carried out to obtain a product corresponding to 6.2 parts of 1,4-diaminoanthraquinone-2,3-disulfonic acid.

EXAMPLE 22

The sulfonation reaction was carried out in the same manner as in Example 21.

After completion of the sulfonation reaction, the cyanogenation reaction was carried out in the same manner as in Example 4 to obtain 4.0 parts of 1,4-diamino-2,3-dicyanoanthraquinone.

EXAMPLES 23 TO 26 the same reaction as in Example 1 was carried out except that the benzyltriethylammonium chloride was replaced by each quaternary ammonium compound as shown in Table 1. The same results as in Example 1 were obtained.

TABLE 1

| Example No. | Quaternary Ammonium Compound |
|---|---|
| 23 | p-Chlorobenzyltriethylammonium Chloride |
| 24 | Octadecyltrimethylammonium Chloride |
| 25 | Dioctadecyldimethylammonium Chloride |
| 26 | Diethyldibenzylammonium Chloride |

EXAMPLES 27 TO 30

The same reaction as in Example 2 was carried out except that the benzyltriethylammonium chloride was replaced by each quaternary ammonium compound as shown in Table 2. The same results as in Example 2 were obtained.

TABLE 2

| Example No. | Quaternary Ammonium Compound |
|---|---|
| 27 | p-Chlorobenzyltriethylammonium Chloride |
| 28 | Octadecyltrimethylammonium Chloride |
| 29 | Dioctadecyldimethylammmonium Chloride |
| 30 | Diethyldibenzylammonium Chloride |

EXAMPLES 31 TO 33

The same reaction as in Example 3 was carried out except that the benzyltrimethylammonium chloride was replaced by each quaternary ammonium compound as shown in Table 3. The same results as in Example 3 were obtained.

TABLE 3

| Example No. | Quaternary Ammonium Compound |
|---|---|
| 31 | Octyltrimethylammonium Chloride |
| 32 | p-Methoxybenzyltriethylammonium Chloride |
| 33 | Dodecyldimethylbenzylammonium Chloride |

EXAMPLES 34 TO 36

The same reaction as in Example 4 was carried out except that the benzyltriethylammonium chloride was replaced by each quaternary ammonium compound as shown in Table 4. The same results as in Example 4 were obtained.

TABLE 4

| Example No. | Quaternary Ammonium Compound |
| --- | --- |
| 34 | Octyltrimethylammonium Chloride |
| 35 | p-Methoxybenzyltriethylammonium Chloride |
| 36 | Dodecyldimethylbenzylammonium Chloride |

EXAMPLES 37 TO 39

The same reaction as in Example 9 was carried out except that the N-butylpyridinium chloride was replaced by each quaternary ammonium compound as shown in Table 5. The same results as in Example 9 were obtained.

TABLE 5

| Example No. | Quaternary Ammonium Compound |
| --- | --- |
| 37 | N—Dodecylpyridinium Iodide |
| 38 | N—Methylpicolinium Chloride |
| 39 | N—Butylpicolinium Chloride |

EXAMPLES 40 TO 42

The same reaction as in Example 10 was carried out except that the N-butylpyridinium chloride was replaced by each quaternary ammonium compound as shown in Table 6. The same results as in Example 10 were obtained.

TABLE 6

| Example No. | Quaternary Ammonium Compound |
| --- | --- |
| 40 | N—Dodecylpyridinium Iodide |
| 41 | N—Methylpicolinium Chloride |
| 42 | N—Butylpicolinium Chloride |

EXAMPLE 43

To a mixture composed of 27.6 parts of benzyltriethylammonium chloride, 5 parts of methyltriphenylphosphonium bromide, and 32.6 parts of water were added 5.0 parts of 1,4-diamino-2,3-dichloroanthraquinone, 0.3 part of boric acid, 0.2 part of anhydrous cupric chloride, and 25 parts of monochlorobenzene. With thorough stirring, 7.18 parts of anhydrous sodium sulfite was added. The reaction mixture was heated to 90° to 95° C., and the reaction was carried out until the chromatographic analysis showed that the starting material was substantially consumed.

The monochlorobenzene was removed from the reaction mixture by steam distillation. After proceeding the same post-treatment as in Example 1, there was obtained a product corresponding to 6.1 parts of 1,4-diaminoanthraquinone-2,3-disulfonic acid.

EXAMPLE 44

The sulfonation reaction was carried out in the same manner as in Example 43.

The monochlorobenzene was removed from the reaction mixture by steam distillation. After proceeding the same cyanogenation reaction as in Example 2, there was obtained 4.1 parts of 1,4-diamino-2,3-dicyanoanthraquinone.

EXAMPLE 45

To a mixture composed of 55.6 parts of benzyltriethylammonium chloride and 55.6 parts of water are added 5.0 parts of 1,4-diamino-2,3-dichloroanthraquinone and 0.3 part of boric acid. With thorough stirring, 5.9 parts of sodium hydrogensulfite was added. The reaction mixture was heated to 90° to 90° C., and the reaction was carried out until the chromatographic analysis showed that the starting material was substantially consumed.

After proceeding the same post-treatment as in Example 1, there was obtained a product corresponding to 5.5 parts of 1,4-diaminoanthraquinone-2,3-disulfonic acid.

EXAMPLE 46

The sulfonation reaction was carried out in the same manner as in Example 45. Subsequently, the cyanogenation reaction was carried out in the same manner as in Example 2 to obtain 3.8 parts of 1,4-diamino-2,3-dicyanoanthraquinone.

While the invention has been described in detail and with reference to specific embodiments thereof, it will be apparent to one skilled in the art that various changes and modifications can be made therein without departing from the spirit and scope thereof.

What is claimed is:

1. A process for producing 1,4-diaminoanthraquinone-2,3-disulfonic acid or an alkali metal salt or ammonium salt thereof which comprises reacting a 1,4-diamino-2,3-dihalogenoanthraquinone with a sulfonating agent selected from the group consisting of an alkali metal sulfite, an alkali metal hydrogensulfite, ammonium sulfite and ammonium hydrogensulfite in an aqueous medium at a temperature of 50° C. or above and at a pH of 4 to 11 in the presence of at least one of a quaternary ammonium compound and a quaternary phosphonium compound, said sulfonating agent being used in an amount of 2.0 to 5.0 moles per mole of the 1,4-diamino-2,3-dihalogenoanthraquinone.

2. A process for producing 1,4-diamino-2,3-dicyanoanthraquinone which comprises (1) reacting a 1,4-diamino-2,3-dihalogenoanthraquinone with a sulfonating agent selected from the group consisting of an alkali metal sulfite, an alkali metal hydrogensulfite, ammonium sulfite and ammonium hyrdrogensulfite, in an aqueous medium at a temperature of 50° C. or above and at a pH of 4 to 11 in the presence of at least one of a quaternary ammonium compound and a quaternary phosphonium compound, said sulfonating agent being used in an amount of 2.0 to 5.0 moles per mole of the 1,4-diamino-2,3-dihalogenoanthraquinone to produce a 1,4-diaminoanthraquinone-2,3-disulfonic acid or salt thereof and (2) further reacting the thus obtained 1,4-diaminoanthraquinone-2,3-disulfonic acid or salt thereof without isolation with a cyanogenation agent at a temperature of 40° to 100° C. and a pH of 8 to 11, said cyanogenation agent being used in an amount of 2.0 to 10 moles per mole of the 1,4-diamino-2,3-dihalogenoanthraquinone.

3. A process as claimed in claim 1, wherein the reaction is carried out in the presence of an inert organic solvent.

4. A process as claimed in claim 2, wherein the reaction of the 1,4-diamino-2,3-dihalogenoanthraquinone with the sulfonating agent is carried out in the presence of an inert organic solvent.

5. A process as claimed in claim 1, wherein the 1,4-diamino-2,3-dihalogenoanthraquinone is 1,4-diamino-2,3-dichloroanthraquinone or 1,4-diamino-2,3-dibromoanthraquinone.

6. A process as claimed in claim 2, wherein the 1,4-diamino-2,3-dihalogenoanthraquinone is 1,4-diamino-2,3-dichloroanthraquinone or 1,4-diamino-2,3-dibromoanthraquinone.

7. A process as claimed in claim 1, wherein the quaternary ammonium compound or quaternary phosphonium compound is at least one of the compounds represented by the following formulae (I) to (III):

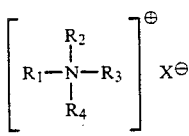
(I)

wherein $R_1$ and $R_2$ are each an alkyl group having 1 to 24 carbon atoms or an unsubstituted or substituted benzyl group; $R_3$ and $R_4$ are an alkyl group having 1 to 10 carbon atoms; and $X^\ominus$ is an anion residue,

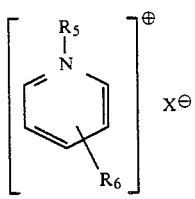
(II)

wherein $R_5$ is an alkyl group having 1 to 24 carbon atoms; $R_6$ is a hydrogen atom or a methyl group; and $X^\ominus$ is an anion residue,

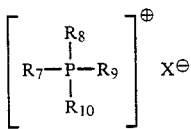
(III)

wherein $R_7$, $R_8$, $R_9$, and $R_{10}$ are each an alkyl group having 1 to 24 carbon atoms or a phenyl group, in which $R_7$ may be a benzyl group; and $X^\ominus$ is an anion residue.

8. A process as claimed in claim 2, wherein the quaternary ammonium compound or quaternary phosphonium compound is at least one of the compounds represented by the following formulae (I) to (III):

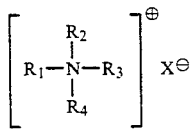
(I)

wherein $R_1$ and $R_2$ are each an alkyl group having 1 to 24 carbon atoms or an unsubstituted or substituted benzyl group; $R_3$ and $R_4$ are an alkyl group having 1 to 10 carbon atoms; and $X^\ominus$ is an anion residue,

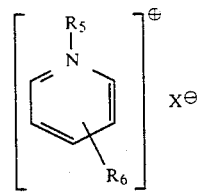
(II)

wherein $R_5$ is an alkyl group having 1 to 24 carbon atoms; $R_6$ is a hydrogen atom or a methyl group; and $X^\ominus$ is an anion residue,

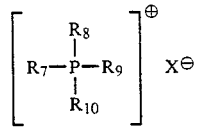
(III)

wherein $R_7$, $R_8$, $R_9$, and $R_{10}$ are each an alkyl group having 1 to 24 carbon atoms or a phenyl group, in which $R_7$ may be a benzyl group; and $X^\ominus$ is an anion residue.

9. A process as claimed in claim 1, wherein the quaternary ammonium compound is at least one of tetraalkylammonium compounds, benzyltrialkylammonium compounds, dibenzyldialkylammonium compounds, N-alkylpyridinium compounds, and N-alkylpicolinium compounds.

10. A process as claimed in claim 2, wherein the quaternary ammonium compound is at least one of tetraalkylammonium compounds, benzyltrialkylammonium compounds, dibenzyldialkylammonium compounds, N-alkylpyridinium compounds, and N-alkylpicolinium compounds.

11. A process as claimed in claim 1, wherein the quaternary ammonium compound is at least one of benzyltrialkylammonium compounds.

12. A process as claimed in claim 2, wherein the quaternary ammonium compound is at least one of benzyltrialkylammonium compounds.

13. A process as claimed in claim 1, wherein the quaternary ammonium compound is used in an amount of 2 to 90 wt% based on the total weight of the quaternary ammonium compound and aqueous medium.

14. A process as claimed in claim 2, wherein the quaternary ammonium compound is used in an amount of 2 to 90 wt% based on the total weight of the quaternary ammonium compound and aqueous sodium.

15. A process as claimed in claim 1, wherein the quaternary phosphonium compound is used in an amount of 2 to 80 wt% based on the total weight of the quaternary phosphonium compound and aqueous medium.

16. A process as claimed in claim 2, wherein the quaternary phosphonium compound is used in an amount of 2 to 80 wt% based on the total weight of the quaternary phosphonium compound and aqueous medium.

17. A process as claimed in claim 11, wherein the benzyltrialkylammonium compound is used in an amount of 10 to 85 wt% based on the total weight of the benzyltrialkylammonium compound and aqueous medium.

18. A process as claimed in claim 12, wherein the benzyltrialkylammonium compound is used in an amount of 10 to 85 wt% based on the total weight of the benzyltrialkylammonium compound and aqueous medium.

19. A process as claimed in claim 9, wherein the tetraalkylammonium compound is used in an amount of 30 to 90 wt% based on the total weight of the tetraalkylammonium compound and aqueous medium.

20. A process as claimed in claim 10, wherein the tetraalkylammonium compound is used in an amount of 30 to 90 wt% based on the total weight of the tetraalkylammonium compound and aqueous medium.

21. A process as claimed in claim 9, wherein the N-alkylpyridinium or N-alkylpicolinium compound is used in an amount of 2 to 60 wt% based on the total weight of the quaternary ammonium compound and aqueous medium.

22. A process as claimed in claim 10, wherein the N-alkylpyridinium or N-alkylpicolinium compound is used in an amount of 2 to 60 wt% based on the total weight of the quaternary ammonium compound and aqueous medium.

23. A process as claimed in claim 2, wherein the cyanogenation agent is an alkali metal cyanide, an alkaline earth metal cyanide, ammonium cyanide, or acetone cyanhydrin.

24. A process as claimed in claim 1, wherein the alkali metal sulfite is sodium sulfite or potassium sulfite.

25. A process as claimed in claim 2, wherein the alkali metal sulfite is sodium sulfite or potassium sulfite.

26. A process as claimed in claim 2, wherein the sulfonating agent is used in an amount of 2.0 to 5.0 moles per mole of the 1,4-diamino-2,3-dihalogenoanthraquinone.

27. A process as claimed in claim 3, wherein the inert organic solvent is at least one of halogenated aromatic hydrocarbons or nitrobenzene.

28. A process as claimed in claim 4, wherein the inert organic solvent is at least one of halogenated aromatic hydrocarbons or nitrobenzene.

* * * * *